UNITED STATES PATENT OFFICE 2,305,295

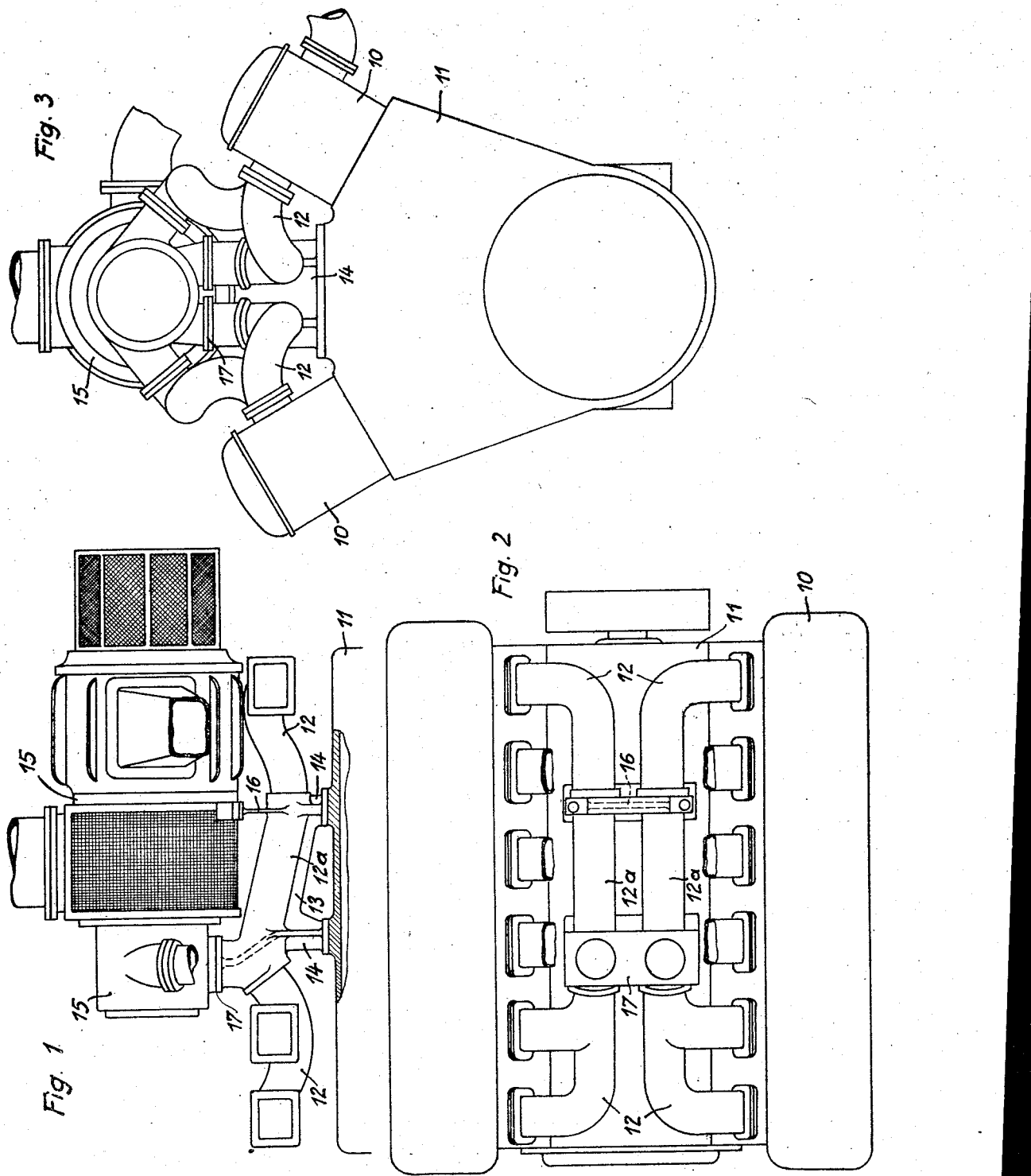

DIESEL ENGINE WITH CHARGING DEVICE

Richard Lang, Ravensburg, and Fritz Koch and Otto Baur, Friedrichshafen-on-the-Bodensee, Germany; vested in the Alien Property Custodian Application October 25, 1940, Serial No. 362,862
In Germany October 28, 1939

7 Claims. (Cl. 60—13)

Our invention relates to Diesel engines, especially in motor driven vehicles, which are provided with a charging device. Usually such device includes a turbine driven by means of the exhaust gases from the cylinders of the main engine. The gases are fed to the device through a conduit of pipes.

Normally the charging device is mounted on cast or welded brackets connected to the engine block. The intake pipes of the turbine have to be bent around such brackets or must penetrate therethrough. This means a complicated shaping of the pipes, a difficult mounting for them and makes the structure expensive, especially in vehicles in which the engine space is limited.

It is the main object of our invention to avoid such disadvantages and to make it possible for the conduit of pipes leading from the outlet openings of the cylinders to the intake of the charging turbine to be of comparatively simple and straight shape.

For this purpose, according to our invention, this conduit of pipes is so dimensioned and shaped that it forms a support for the charging device, thus avoiding special brackets for supporting this device.

If the charging device is supported by the conduit at both ends it is advantageous to provide a solid connection at one end only and to make the support at the other end so thin that the heat tensions occurring in the pipes of the conduit are not transmitted to the charging device so that it may not be distorted.

We prefer to arrange the supporting conduit of pipes between the cylinders of the main engine in case there be two rows of cylinders.

Having given a general description of our invention we now want to point it out more in detail having reference to the drawing which represents an example embodying our invention.

Fig. 1 is a diagrammatic side view of the upper portion of a Diesel engine with charging device, partly in section. Fig. 2 is a corresponding diagrammatic plan view, and Fig. 3 is the corresponding front view thereto, also more or less diagrammatic.

In Fig. 1 the cylinders of the Diesel engine are assumed to be removed, for the purpose of better understanding; and in Fig. 2 the charging device is supposed to be removed, for the same purpose.

The engine has twelve cylinders 10 mounted in two rows in V-shape on the casing 11. Between these two rows and on top of the casing 11 the conduits 12 for the exhaust pipes are situated. Their middle portions 12a are made extremely strong and also strengthened by ribs 13. They have feet portions 14 resting on top of the engine casing 11. The charging device 15 at its left hand turbine end at 17 is mounted directly on the conduit portions 12a which may be formed integral, and such mounting 17 will have ports therethrough for conducting exhaust gases from the conduit into the turbine, all as represented in the drawing. At the right hand air blower end of the conduit portions 12a a special support 16 is provided on which the charging device 15 rests. The wall of this rib support is made extremely thin so as to allow for a certain resiliency so that heat tensions occurring in the conduits 12, 12a are not transmitted to the charging device 15. For the same reason the main dimension of this support 16 is cross to the longitudinal direction of the conduits 12, 12a.

We do not want to be limited to the details described or shown in the drawing, as many variations may occur to those skilled in the art without deviating from the scope of our invention.

What we claim is:

1. In a Diesel engine in combination: a group of engine cylinders, a charging device driven by exhaust gases from said cylinders, a conduit of pipes for said exhaust gases, said conduit being shaped to serve as a support for said charging device, said charging device at one point resting directly on and secured to said exhaust conduit, and an intermediate supporting element inserted between said conduit and said charging device for supporting said charging device at another point, said supporting element being yieldable in character so that heat tensions in the exhaust conduit are not transmitted to the charging device.

2. In a Diesel engine in combination: a group of engine cylinders arranged in two oppositely situated rows of cylinders, a charging device driven by exhaust gases from said cylinders, and a conduit of pipes for said exhaust gases, said conduit forming a support for said charging device and being situated intermediate said two rows of cylinders, and means secured to the engine casing supporting the exhaust conduit independently of the engine cylinders.

3. In a Diesel engine having opposing rows of cylinders arranged in V formation, exhaust manifold means for the cylinders extending lengthwise within the V space between the cylinder rows and supported by the underlying portion of the engine casing, an exhaust gas driven turbine and air blower engine charging unit overlying said exhaust manifold means with its axis extending lengthwise of the engine, and a plurality of securing means spaced lengthwise of the exhaust manifold supporting the charging unit on said exhaust manifold.

4. In a Diesel engine having a group of engine cylinders, exhaust gas manifold means connecting with the cylinders having a reinforced portion extending lengthwise of the engine, means supporting said reinforced manifold portion on the engine independently of the gas connections between the manifold and the engine cylinders, an exhaust driven turbine and air blower charging unit mounted on and extending lengthwise of said reinforced exhaust manifold portion.

5. In a Diesel engine having opposing rows of cylinders arranged in V formation, exhaust manifold means connecting with the engine cylinders having a central portion extending lengthwise within the V space between the cylinder rows, said central exhaust manifold portion being strengthened by reinforcing ribs and having mounting means securing the same to the underlying portion of the engine casing between the cylinder rows, and an exhaust gas driven turbine and air blower engine charging unit mounted on said reinforced central exhaust manifold portion.

6. In a Diesel engine having opposing rows of cylinders arranged in V formation, exhaust manifold means extending lengthwise within the V space between the cylinder rows, a charging device driven by engine exhaust gases located above said exhaust manifold means with its axis extending lengthwise of the engine, and a plurality of mounting means on the exhaust manifold means at longitudinally spaced points thereof supporting the charging device, one of said mounting means forming a rigid connection between the exhaust manifold and the charging device and having passage means therein through which exhaust gases from the manifold are supplied to drive the charging device.

7. In a Diesel engine according to claim 6, including the additional feature that the second mounting means for securing the charging device to the exhaust manifold means and located in lengthwise spaced relation to the rigid mounting means comprises a yieldable connection providing for a lengthwise heat expansion of the manifold means independently of, and without transmitting stresses to, the charging device.

RICHARD LANG.
FRITZ KOCH.
OTTO BAUR.